United States Patent
Bronzoni

(10) Patent No.: US 12,553,844 B2
(45) Date of Patent: Feb. 17, 2026

(54) METHOD OF DETERMINING TESTING PARAMETERS OF A MELT FLOW RATE TESTING APPARATUS

(71) Applicant: Illinois Tool Works Inc., Glenview, IL (US)

(72) Inventor: Marco Bronzoni, Pecetto Torinese (IT)

(73) Assignee: Illinois Tool Works Inc., Glenview, IL (US)

( * ) Notice: Subject to any disclaimer, the term of this patent is extended or adjusted under 35 U.S.C. 154(b) by 847 days.

(21) Appl. No.: 17/863,979

(22) Filed: Jul. 13, 2022

(65) Prior Publication Data

US 2023/0014561 A1   Jan. 19, 2023

(30) Foreign Application Priority Data

Jul. 16, 2021 (EP) .................................. 21186147
Jul. 12, 2022 (EP) .................................. 22184484

(51) Int. Cl.
*G01N 11/04* (2006.01)
*G01N 11/06* (2006.01)
*G01N 25/04* (2006.01)
*G01N 33/44* (2006.01)
*G01N 11/00* (2006.01)

(52) U.S. Cl.
CPC ............. *G01N 25/04* (2013.01); *G01N 11/04* (2013.01); *G01N 11/06* (2013.01); *G01N 33/442* (2013.01); *G01N 2011/0006* (2013.01)

(58) Field of Classification Search
CPC ...... G01N 25/04; G01N 11/04; G01N 33/442; G01N 2011/0006; G01N 11/06
See application file for complete search history.

(56) References Cited

U.S. PATENT DOCUMENTS

| 4,882,930 A * | 11/1989 | Nagy ...................... | G01N 11/04 |
| | | | 73/54.11 |
| 9,746,406 B2 * | 8/2017 | Flock ........................ | B08B 9/04 |
| 11,499,901 B2 * | 11/2022 | Czazasty ................ | G01N 11/02 |
| 12,270,744 B2 * | 4/2025 | Galizia .................. | G01N 11/02 |
| 2016/0091404 A1 | 3/2016 | Flock | |

OTHER PUBLICATIONS

European Office Communication AppIn No. 22184484.8 dated Nov. 24, 2022.

(Continued)

*Primary Examiner* — Randy W Gibson
(74) *Attorney, Agent, or Firm* — McAndrews Held & Malloy, Ltd.

(57) ABSTRACT

The present invention provides a method of determining testing parameters of a melt flow rate testing apparatus, comprising the steps of: (i) providing a reference input indicative of a selection of a melt flow rate testing procedure from a predetermined list of melt flow rate testing procedures; (ii) providing a characteristic input indicative of a load mass and a testing temperature for melt flow rate testing; (iii) providing a sample input indicative of an estimated value of the melt flow rate of the sample; and (iv) determining at least one characteristic testing parameter for the melt flow rate testing apparatus, utilising a representative value generated from a predetermined combination of any one of said reference input, said characteristic input and said sample input.

14 Claims, 6 Drawing Sheets

| | | End condition | |
|---|---|---|---|
| Smart Step 1 = ISO | | LENGTH | 30 mm |
| Smart Step 1 = ASTM A | | DURATION | (**) |
| Smart Step 1 = ASTM B/C | | LENGTH | (***) |

| (**) | | |
|---|---|---|
| Smart Step 3 expected MFR | | End condition |
| min (excl.) | max (included) | (DURATION) [s] |
| 0 | 1 | 360 |
| 1 | 3.5 | 180 |
| 3.5 | 10 | 60 |
| 10 | 25 | 30 |
| 25 | 100 | 15 |
| 100 | 500 | 5 |
| 500 | 2000 | 2 |

| (***) | | |
|---|---|---|
| Smart Step 3 expected MFR | | End condition |
| min (excl.) | max (included) | (LENGTH) [mm] |
| 0 | 10 | 6.35 |
| 10 | 2000 | 25.4 |

(56) References Cited

OTHER PUBLICATIONS

BSI: "Plastics—Determination of the melt mass-flow rate (MFR) and melt volume flow rate (MVR) of thermoplastics (ISO 1133:2005)", European Standard EN ISO 1133, Jun. 27, 2005 (Jun. 27, 2005), pp. 1-26, XP055885932.
70099-EP Intention to Grant appln No. 22184484.8 dated Feb. 28, 2024.
70099-EP Intention to Grant appln No. 22184484.8 dated Jun. 17, 2024.
70099-EP Result of consultation appln No. 22184484.8 dated Feb. 13, 2024.
70099-EP Withdrawal to Grant appln No. 22184484.8 dated Jun. 14, 2024.

* cited by examiner

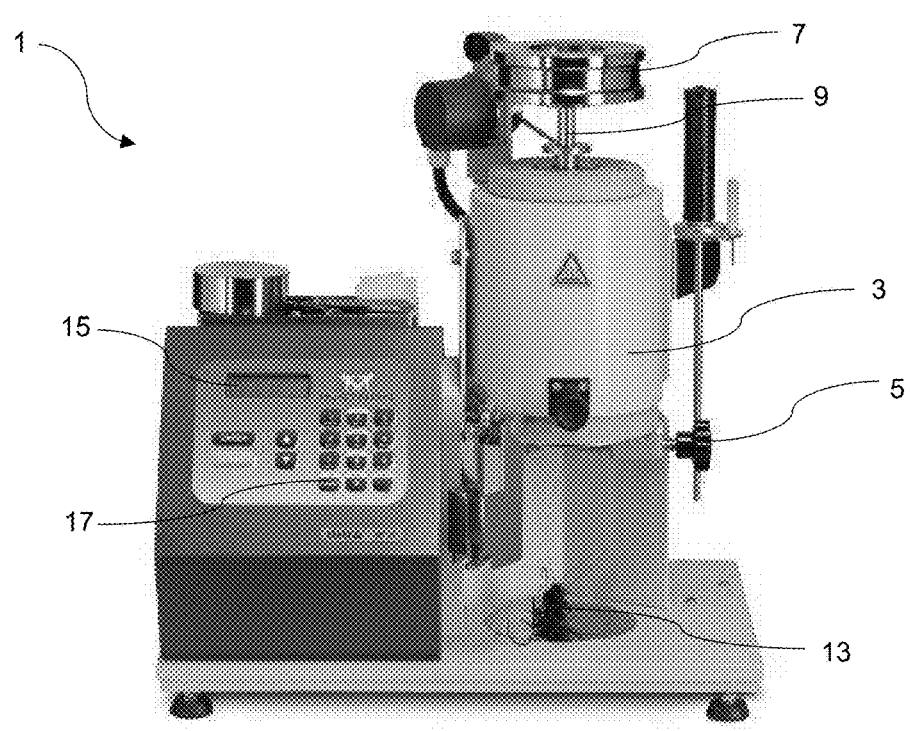
(a)
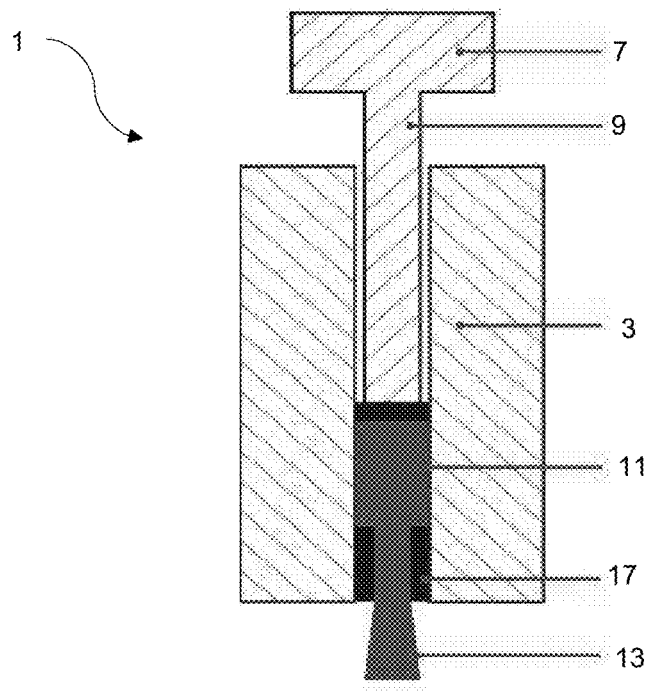
(b)
FIG.1 (PRIOR ART)

|  | Smart step 1 (procedure type) | | | | | |
| --- | --- | --- | --- | --- | --- | --- |
|  | ISO A | ISO B | ISO B Half Die | ASTM A | ASTM B | ASTM C |
| Test temp. | Value of Smart step 2 | Value of Smart step 2 | Value of Smart step 2 | Value of Smart step 2 | Value of Smart step 2 | Value of Smart step 2 |
| Test mass | Value of Smart step 2 | Value of Smart step 2 | Value of Smart step 2 | Value of Smart step 2 | Value of Smart step 2 | Value of Smart step 2 |
| Capillary diam. | 2.095 [mm] | 2.095 [mm] | 1.050 [mm] | 2.095 [mm] | 2.095 [mm] | 1.048 [mm] |
| Capillary length | 8.00 [mm] | 8.00 [mm] | 4.00 [mm] | 8.00 [mm] | 8.00 [mm] | 4.00 [mm] |

FIG.2

|  | Smart step 1 (procedure type) | | | | | |
| --- | --- | --- | --- | --- | --- | --- |
|  | ISO A | ISO B | ISO B Half Die | ASTM A | ASTM B | ASTM C |
| Max test duration | 25 [min] | 25 [min] | 25 [min] | 25 [min] | 25 [min] | 25 [min] |
| Min preheat | 300 [s] | 300 [s] | 300 [s] | 390 [s] | 390 [s] | 390 [s] |
| Max preheat | 1200 [s] | 1200 [s] | 1200 [s] | 450 [s] | 450 [s] | 450 [s] |
| Max deltaT | 0.5 [°C] | 0.5 [°C] | 0.5 [°C] | 0.5 [°C] | 0.5 [°C] | 0.5 [°C] |

FIG.3

|  | Start condition | |
| --- | --- | --- |
| Smart Step 1 = ISO | POSITION | 50 mm |
| Smart Step 1 = ASTM | POSITION | 46 mm |

FIG.4

| | Min position at the end |
|---|---|
| Smart Step 1 = ISO | 20 mm |
| Smart Step 1 = ASTM | 18.35 mm |

FIG.5

| | Type of individual measurement |
|---|---|
| Smart Step 1 = ISO A | LENGTH (P) |
| Smart Step 1 = ASTM A | DURATION (T) |
| Smart Step 1 = ISO B/C or ASTM B/C | DURATION (T) |

FIG.6

| Step 1 = ISO A or ASTM A | |
|---|---|
| Number of measurements | 1 |

FIG.7

| | Drop-down options for Cut |
|---|---|
| Smart Step 1 = ISO A | @ Start & end of measurements |
| Smart Step 1 = ISO B/half or ASTM (all) | @ Start & end of measurements |

FIG.8

| | Flow rate calculation factor |
|---|---|
| Smart Step 1 = ISO | ISO |
| Smart Step 1 = ASTM | ASTM |

FIG.9

| Smart Step 3 expected MFR ||  Die plug engagement |
| min (excl.) | max (included) | |
| 0 | 50 | NO |
| 50 | 2000 | YES (*) |

FIG.10

| Smart Step 3 expected MFR || Loading setting |
| min (excl.) | max (included) | |
| 0 | 10 | Piston with test masses |
| 10 | 20 | Piston load only |
| 20 | 2000 | No load (magnetic piston) (*) |

Piston holding position = 60 mm

FIG.11

| Smart Step 3 expected MFR || Smart Step 1 – ISO (A/B/half) | Smart Step 1 – ASTM (A/B/C) |
| min (excl.) | max (included) | Sample quantity [g] | Sample quantity [g] |
| 0 | 0.4 | 3 | 2.5 |
| 0.4 | 0.5 | 4 | 2.5 |
| 0.5 | 1 | 4 | 3 |
| 1 | 1.5 | 4 | 3 |
| 1.5 | 2 | 4 | 3.5 |
| 2 | 2.5 | 4.5 | 3.5 |
| 2.5 | 4.5 | 4.5 | 4 |
| 4.5 | 7 | 4.5 | 4.5 |
| 7 | 10 | 4.5 | 5 |
| 10 | 40 | 5 | 6 |
| 40 | 2000 | 6 | 6 |

FIG.12

| Smart Step 3 expected MFR | | Phase end condition = TIME [s] | |
|---|---|---|---|
| min (excl.) | max (included) | | |
| 0 | 10 | 5 | |
| 10 | 20 | 60 | |
| 20 | 50 | 180 | |
| 50 | 2000 | 300 | 380 |
| | | Smart Step 1 = ISO (A/B/half) | Smart Step 1 = ASTM (A/B/C) |

FIG.13

| Step 1 = ISO B/C or ASTM B/C | | |
|---|---|---|
| Smart Step 3 expected MFR | | Duration of each measurement [s] |
| min (exclud.) | max (included) | |
| 0 | 0.5 | 240 |
| 0.5 | 2 | 120 |
| 2 | 5 | 60 |
| 5 | 10 | 20 |
| 10 | 20 | 10 |
| 20 | 50 | 5 |
| 50 | 200 | 3 |
| 200 | 500 | 1 |
| 500 | 2000 | 0.5 |

FIG.14

| | End condition | |
|---|---|---|
| Smart Step 1 = ISO | LENGTH | 30 mm |
| Smart Step 1 = ASTM A | DURATION | (**) |
| Smart Step 1 = ASTM B/C | LENGTH | (***) |

| (**) | | |
|---|---|---|
| Smart Step 3 expected MFR | | End condition (DURATION) [s] |
| min (excl.) | max (included) | |
| 0 | 1 | 360 |
| 1 | 3.5 | 180 |
| 3.5 | 10 | 60 |
| 10 | 25 | 30 |
| 25 | 100 | 15 |
| 100 | 500 | 5 |
| 500 | 2000 | 2 |

| (***) | | |
|---|---|---|
| Smart Step 3 expected MFR | | End condition (LENGTH) [mm] |
| min (excl.) | max (included) | |
| 0 | 10 | 6.35 |
| 10 | 2000 | 25.4 |

| (any Smart input) | |
|---|---|
| Max charging duration [min] | 1 min |

(b)

| (any Smart) | Min time from extra force |
|---|---|
| | 2 min |

(c)

| (any Smart) | Final purging | Homing |
|---|---|---|
| | NO | NO |

(d)

| (any Smart) | Default melt density | Priority format |
|---|---|---|
| | 1.000 g/cm3 | MFR |

(e)

| | Outliers detection | Pass/Fail check | Acceptance values #1 | Acceptance values #2 |
|---|---|---|---|---|
| (any Smart) | NONE | within +/- percentage | expected MFR value from Step 3 | 3 [%] |

FIG.16

METHOD OF DETERMINING TESTING PARAMETERS OF A MELT FLOW RATE TESTING APPARATUS

TECHNICAL FIELD

This disclosure relates generally to a method of determining testing parameters. In particular, this disclosure relates to a method of determining testing parameters of a melt flow rate testing apparatus.

BACKGROUND

A melt flow rate apparatus is an instrument used to measure the quantity of a sample polymer melt flowing through a die, to characterise the flow of the sample in a viscous state. FIG. 1 shows an example of a melt flow rate apparatus 1, having a temperature-controlled cylindrical annulus 3 through which a polymer material 11 is forced to flow through a die 17 of a specific length and diameter using a piston 9 which is actuated by a weight 7. The weight of a polymer melt material 13 flowing through the die 17 is measured to determine the melt flow rate of the material 11. If required, a melt cutter 5 is provided to cut the polymer melt. The melt flow rate apparatus 1 has an incorporated interface 15 on which a user can select and input testing parameters using a keypad 17. The inputs set the operating conditions of the melt flow rate testing apparatus 1 for performing melt flow rate testing.

When performing a melt flow rate test, one of the main challenges is the definition of suitable testing parameters for a particular sample. Every test sample is different, and therefore to carry out a melt flow rate test which is valid and according to international standards such as ISO standard 1133 and ASTM standard D1238, definitions of values for up to 30 parameters must be input manually by a user to obtain consistent and accurate melt flow rate values.

The typical parameters used to define a melt flow rate testing include: testing temperature; test mass; capillary diameter and length of a die; maximum testing duration; minimum and maximum preheating duration; maximum temperature deviation from a setpoint during preheating; characterisation of the use of a die plug during charging; sample quantity; maximum charging duration; characterisation of the use of a die plug during preheating; preheating sequence, which includes piston holding, the application of a test mass, compacting, where each subphase requires a duration, capillary length, load mass and characterisation of the use of a die plug; preheating end condition; measurement start condition; measurement total duration or length; type of individual measurement, being a time measurement or a positional measurement; individual measurement for duration or length; number of individual measurements; characterisation of the use and frequency of melt cutting; characterisation of the preferred format of results, being either a melt flow rate (mass per unit time), or a melt volume rate (volume per unit time); flow rate calculation factor, characterisation of the use of automatic algorithms for the detection of outliers; melt density value; and a characterisation of the use of acceptance criteria for the evaluation of results.

The manual input of these extensive parameters requires significant effort in the setup and performing of a melt flow rate test. The effort required to perform melt flow rate tests is amplified further when different types of samples are tested in succession, meaning that for each test, the specific parameters for a given sample must be adapted significantly or even in their entirety from the previous test.

It would be desirable to provide a method of determining testing parameters of a melt flow rate testing apparatus, that improves the ease of use of melt flow rate testing for different types of samples. Particularly, it is an object of the disclosure to provide a method of determining testing parameters of a melt flow rate testing apparatus that makes the setup and performing of melt flow rate testing more efficient, and improves the ease of use of a melt flow rate testing apparatus. It is another object of the disclosure to provide a method of determining testing parameters of a melt flow rate testing apparatus that improves the efficiency of inputting testing parameters into a melt flow rate testing apparatus.

The present disclosure provides at least an alternative to methods of determining testing parameters of a melt flow rate testing apparatus of the prior art.

SUMMARY

In accordance with the present disclosure there is provided a method of determining testing parameters of a melt flow rate testing apparatus according to the appended claims.

According to an aspect of the present disclosure, there is provided a method of determining testing parameters of a melt flow rate testing apparatus. The method comprises the steps of:
  (i) providing a reference input indicative of a selection of a melt flow rate testing procedure from a predetermined list of melt flow rate testing procedures;
  (ii) providing a characteristic input indicative of a load mass and a testing temperature for melt flow rate testing;
  (iii) providing a sample input indicative of an estimated value of the melt flow rate of the sample; and
  (iv) determining at least one characteristic testing parameter for the melt flow rate testing apparatus, utilising a representative value generated from a predetermined combination of any one of the reference input, the characteristic input and the sample input.

Thus, based on the selection of a melt flow rate testing procedure, the load mass, the testing temperature and an estimated value of a melt flow rate of the sample, further testing parameters of the melt flow rate can be determined, without further manual input. This more readily defines a suitable melt flow rate testing, leading to more consistent melt flow rate values. This is particularly advantageous, when different types of samples are to be tested because testing parameters are different for each sample, which would otherwise requiring fine-tuning a series of parameters based on guidelines from international standards, or based on technical expertise. By providing the reference input, the characteristic input and the sample input, the determination of at least one characteristic testing parameter is triggered to select a suitable value or (set of) values for carrying out a melt flow rate test of a sample.

Advantageously, in some embodiments, the method further comprises the step of interpolating and/or extrapolating the representative value from a predetermined standard for any one of the reference input, the characteristic input and the sample input.

In some embodiments, the reference input is indicative of a selection of the melt flow rate testing procedure from a predetermined list of melt flow rate testing procedures comprising reference standard procedures from ISO standard 1133 and ASTM standard D1238.

In some embodiments, the predetermined list of melt flow rate testing procedures comprises: procedure A of ISO standard 1133; procedure B of ISO standard 1133; procedure B of ISO standard 1133 with a half die; procedure A of ASTM standard D1238; procedure B of ASTM standard D1238; and procedure C of ASTM standard D1238.

Advantageously, in some embodiments, the sample input is indicative of an estimated range of values of the melt flow rate of the sample.

In some embodiments, the step of determining at least one characteristic testing parameter comprises determining a mass of the sample for melt flow rate testing.

In some embodiments, the step of determining at least one characteristic testing parameter comprises determining at least one geometric parameter of a die of the melt flow rate apparatus.

Advantageously, in some specific embodiments, the at least one geometric parameter of the die comprises a capillary diameter.

In some specific embodiments, the at least one geometric parameter of the die comprises a capillary length.

Advantageously, in some embodiments, the step of determining at least one characteristic testing parameter comprises determining at least one of a minimum preheating duration and a maximum preheating duration.

Advantageously, in some embodiments, the step of determining at least one characteristic testing parameter comprises determining a loading mode for the melt flow rate testing apparatus.

Advantageously, in some embodiments, the method further comprises the step of generating a preset setting comprising the determined at least one characteristic testing parameter of the melt flow rate testing apparatus.

According to another aspect of the present disclosure, there is provided a method of testing the melt flow rate of a sample using a melt flow rate testing apparatus, comprising the method of determining testing parameters of a melt flow rate testing apparatus, and further comprising the step of configuring the testing parameters of the melt flow rate testing apparatus to correspond to the at least one determined characteristic testing parameter.

Thus, the determined testing parameters are used to adapt the parameters of the melt flow rate testing apparatus, making the apparatus suitable for carrying out a valid melt flow rate test for a specific sample. This is particularly beneficial when the sample for testing is changed from one to another, since less inputs are required to carry out a suitable melt flow rate test.

In some embodiments, the method further comprises the step of performing a melt flow rate test on the sample.

According to a further aspect of the present disclosure, there is provided a melt flow rate testing apparatus, comprising a processor configured to carry out the method of determining testing parameters of a melt flow rate testing apparatus, or the method of the method of testing the melt flow rate of a sample using a melt flow rate testing apparatus.

BRIEF DESCRIPTION OF THE DRAWINGS

Embodiments are now described, by way of example only, hereinafter with reference to the accompanying drawings, in which:

FIG. 1 illustrates a: (a) representation of a known melt flow rate testing apparatus; and (b) section view through the melt flow rate testing apparatus;

FIG. 2 illustrates a testing parameter table including the capillary diameter and capillary length of a die, for a number of procedures according to international standards ISO 1133 and ASTM D1238;

FIG. 3 illustrates a testing parameter table including the minimum and maximum preheating duration, for a number of procedures according to international standards ISO 1133 and ASTM D1238;

FIG. 4 illustrates a testing parameter table including the start condition positions, for melt flow rate testing according to international standards ISO 1133 and ASTM D1238;

FIG. 5 illustrates a testing parameter table including the minimum positions at the end of measurements, for melt flow rate testing according to international standards ISO 1133 and ASTM D1238;

FIG. 6 illustrates a testing parameter table including the type definitions of individual measurements, being a length measurement or a duration measurement, for melt flow rate testing according to international standards ISO 1133 and ASTM D1238;

FIG. 7 illustrates a testing parameter table including a definition of the number of measurements, for melt flow rate testing according to procedure A of international standards ISO 1133 and ASTM D1238;

FIG. 8 illustrates a testing parameter table including measurement parameters for melt cutting, for melt flow rate testing according to international standards ISO 1133 and ASTM D1238;

FIG. 9 illustrates a testing parameter table including a definition of the flow rate calculation factor, for melt flow rate testing according to international standards ISO 1133 and ASTM D1238;

FIG. 10 illustrates a testing parameter table including a characterisation of die plug engagement, for melt flow rate testing according to an estimated value of the sample melt flow rate;

FIG. 11 illustrates a testing parameter table including a definition of the load, for melt flow rate testing according to an estimated value of the sample melt flow rate;

FIG. 12 illustrates a testing parameter table including sample quantities, for melt flow rate testing according to international standards ISO 1133 and ASTM D1238, and according to an estimated value of the sample melt flow rate;

FIG. 13 illustrates a testing parameter table including phase end condition times, for melt flow rate testing according to international standards ISO 1133 and ASTM D1238, and according to an estimated value of the sample melt flow rate;

FIG. 14 illustrates a testing parameter table including measurement durations, for melt flow rate testing according to procedures B and C of international standards ISO 1133 and ASTM D1238, and according to an estimated value of the sample melt flow rate;

FIG. 15 illustrates a testing parameter table including end condition lengths and durations, for melt flow rate testing according to international standards ISO 1133 and ASTM D1238, and according to an estimated value of the sample melt flow rate; and FIG. 16 illustrates a testing parameter table for melt flow rate testing common to some example melt flow rate testing procedures, including (a) a definition of the maximum charging duration; (b) a definition of the minimum time from the application of an extra force; (c) a characterisation of final purging and homing; (d) a definition of a default melt density and priority format of output values; and (e) a characterisation of outlier detection, a pass/fail check, first and second melt flow rate acceptance value criterion parameters.

DETAILED DESCRIPTION

Certain terminology is used in the following description for convenience only and is not limiting. The words 'right', 'left', 'lower', 'upper', 'front', 'rear', 'upward', 'down' and 'downward' designate directions in the drawings to which reference is made and are with respect to the described component when assembled and mounted. The words 'inner', 'inwardly' and 'outer', 'outwardly' refer to directions toward and away from, respectively, a designated centreline or a geometric centre of an element being described (e.g. central axis), the particular meaning being readily apparent from the context of the description.

Further, as used herein, the terms 'connected', 'attached', 'coupled', 'mounted' are intended to include direct connections between two members without any other members interposed therebetween, as well as, indirect connections between members in which one or more other members are interposed therebetween. The terminology includes the words specifically mentioned above, derivatives thereof, and words of similar import.

Further, unless otherwise specified, the use of ordinal adjectives, such as, "first", "second", "third" etc. merely indicate that different instances of like objects are being referred to and are not intended to imply that the objects so described must be in a given sequence, either temporally, spatially, in ranking or in any other manner.

Like reference numerals are used to depict like features throughout.

Determining Testing Parameters Based on a Melt Flow Rate Testing Procedure

Referring now to FIG. 2, there is shown a testing parameter table. Along the top of the table are a number of different melt flow rate testing procedures, including procedure A of ISO 1133: 2011, procedure B of ISO 1133: 2011, procedure B (half-sized die) of ISO 1133: 2011, procedure A of ASTM D1238: 2013, procedure B of ASTM D1238: 2013, and procedure C of ASTM D1238: 2013. As will be apparent to the skilled person, the type of melt flow rate test indicates whether a test is manually run or is run with the aid of a displacement sensor, and whether a specific procedure for high-flow materials is followed. Each procedure corresponds with a specific value of the capillary diameter and the capillary length of the melt flow rate testing die. These explicit values are set out in ISO standard 1133-1: 2011, clause 5.1.5, and ASTM standard D1238: 2013, clauses 5.3.1 and 5.3.2. Therefore, depending upon a reference input that is indicative of a selected melt flow rate testing procedure from a predetermined list including the procedures in the table, corresponding values of the capillary diameter and the capillary length can be determined. The table of FIG. 2 also contains rows pertaining to the testing temperature and the testing (i.e. loading) mass, which are received as a characteristic input. Often, there are different options for testing temperature and testing mass allowed by international standards for different types of material samples to be tested. Therefore, the testing temperature and the testing mass are indicated by a characteristic input. The characteristic input may, for example, be dependent on historical testing data, or based on a user's decision.

FIG. 3 shows another testing parameter table. Like the previous table, along the top of the table are a number of different melt flow rate testing procedures, including procedure A of ISO 1133: 2011, procedure B of ISO 1133: 2011, procedure B (half-sized die) of ISO 1133: 2011, procedure A of ASTM D1238: 2013, procedure B of ASTM D1238: 2013, and procedure C of ASTM D1238: 2013. Each procedure corresponds to a maximum test duration value of 25 minutes, and a maximum temperature deviation from a setpoint of 0.5° C. The maximum test duration values are explicit values set out in ISO standard 1133-1: 2011, clause 8.4. It is noted that the maximum test values are not specified in ASTM standard D1238: 2013, but these values for the ASTM procedures are harmonised with those for the ISO procedures. The maximum temperature deviation values are values set out in table 1 of ISO standard 1133-1: 2011, clause 5.1.4 of ISO standard 1133-2: 2011, and table 1 of ASDTM standard D1238: 2013. Each procedure also corresponds with a specific value of the minimum and maximum preheating durations of the melt flow rate test. The minimum preheating duration values are explicit values set out in ISO standard 1133-1: 2011, clause 8.4, and ASTM standard D1238: 2013, clauses 9.7 and 10.9. The maximum preheating duration values for ASTM procedures are explicit values which are set out in ASTM standard D1238: 2013, clauses 9.7 and 10.9. However, the maximum preheating duration values for ISO procedures are not explicit values. Rather, they are interpolated values based on the maximum testing time. Depending on a reference input that is indicative of a selected melt flow rate testing procedure from a predetermined list including the procedures in the table, corresponding values of the minimum and maximum preheating durations of the melt flow rate test are determined.

FIG. 4 shows a testing parameter table for measurement start conditions. The table has two rows of measurement start condition values, one value being 50 mm for ISO melt flow rate tests which are explicit values found in ISO 1133, clauses 8.4 and 9.5, and the other being 46 mm for ASTM tests which are explicit values found in ASTM D1238, clauses 9.9 and 10.12. Therefore, depending on a reference input indicative of a selected melt flow rate testing procedure, being either a melt flow rate test procedure under ISO 1133, or under ASTM D1238, corresponding values of the measurement start conditions are determined.

FIG. 5 shows a testing parameter table for minimum positions at the end of measurements. The table also has two rows of values for minimum positions at the end of measurements, one value being 20 mm for ISO melt flow rate tests which are explicit values found in ISO 1133, clauses 8.4 and 9.5, and the other being 18.35 mm for ASTM tests which are explicit values found in ASTM D1238, clause 12.1.3. It is noted that the value of 18.35 mm for ASTM melt flow rate tests is specific for procedure type D of ASTM standard D1238, but here this value is extended to procedures of ASTM melt flow rate tests including procedures A, B and C. Depending on a reference input indicative of a selected melt flow rate testing procedure, being either a melt flow rate test procedure under ISO standard 1133, or under ASTM standard D1238, corresponding values of the minimum positions at the end of measurements are determined.

FIG. 6 shows a testing parameter table for type definitions of individual measurements, being a length measurement or a duration measurement. The table has three rows, one for procedure A of ISO standard 1133, another for procedure A of ASTM standard D1238, and the last for procedures B and C of ISO standard 1133 and ASTM standard D1238. The values are harmonised from procedure B of ISO 1133, clause 9.5. Based on a reference input indicative of a selected melt flow rate testing procedure, corresponding values of definitions of individual measurements, being a length measurement or a duration measurement, are determined.

FIG. 7 shows a testing parameter table for defining a number of measurements for procedure A of ISO standard 1133 and ASTM standard D1238, as a single measurement. Therefore, from a reference input indicating that the melt flow rate test is a type A test under either ISO standard 1133 or ASTM standard D1238, it is determined that a single measurement is required.

FIG. 8 shows a testing parameter table defining measurements for melt cutting for melt flow rate testing according to international standards ISO 1133 and ASTM D1238. The table has two rows, one row for procedure A melt flow rate tests under ISO standard 1133, and another row for procedure A melt flow rate tests under ATSM standard D1238. For ISO 1133 melt flow rate testing, indications of the measurements for melt cutting are given in ISO 1133, clause 8.4 for procedure type A of ISO 1133, and ISO 1133, sections 8 and 9 for procedure types B and B-half die. For ASTM D1238 melt flow rate testing, indications of the measurements for melt cutting are given in ASTM D1238, sections 9 and 10. Based on a reference input indicative of a selected melt flow rate testing procedure, corresponding measurements for melt cutting for melt flow rate testing are determined.

FIG. 9 shows a testing parameter table for defining a flow rate calculation factor. The table also has two rows of values for a flow rate calculation factor, one for ISO 1133 melt flow rate testing found in ISO 1133, clause 9.6.2, and the other for ASTM D1238 tests which are found in ASTM D1238, section 13. Depending on a reference input indicative of a selected melt flow rate testing procedure, being either a melt flow rate test procedure under ISO standard 1133, or under ASTM standard D1238, corresponding values of the flow rate calculation factor.

Therefore, based on a reference input indicative of a selected melt flow rate testing procedure, at least one characteristic testing parameter for the melt flow rate testing apparatus can be determined utilising a generated representative value. This allows the operating parameters of the melt flow testing apparatus to be at least partially filled, or completely filled to improve the efficiency of melt flow rate testing. The testing parameters may then be configured for the melt flow rate testing apparatus to correspond to the determined characteristic testing parameter(s) to run a melt flow rate test. The determination of the at least one characteristic testing parameter may be carried out by a processor of the melt flow rate testing apparatus.

Determining Testing Parameters Based on Estimated Values of the Melt Flow Rate

FIG. 10 shows a testing parameter table for characterising whether a die plug is engaged during melt flow rate testing. The table has two rows, one row for a range of estimated melt flow rate values in the range of 0 to 50 (g/10 min) corresponding to an operating setting of no engagement of a die plug, and another row for a range of estimated melt flow rate values in the range of 50 to 2000 (g/10 min) corresponding to an operating setting of engagement of a die plug, if this is compatible with the testing configuration. These ranges of melt flow rate values are found in ASTM D1238, clause 10.11. It is noted that though these ranges of melt flow rate values are not present in ISO 1133. The values for ASTM are equally applicable to melt flow rate testing procedures under ISO 1133. Depending on a sample input indicative of an estimated value of the sample melt flow rate, a corresponding characterisation of the engagement of the die plug is determined.

FIG. 11 shows a testing parameter table for defining a loading setting of the melt flow rate testing apparatus. The table has three rows, and each row of the table corresponds to a different loading setting depending on the estimated melt flow rate provided as a sample input. If the estimated melt flow rate is estimated to be between 0 to 10 (g/10 min), then the loading setting is determined to be the application of a piston with test masses, as set out in clause 8.3 of ISO 1133 and clause 9.6 of ASTM D1238. If the estimated melt flow rate is instead estimated to be between 10 and 20 (g/10 min), then in this particular example, the loading setting is determined to be the application of a piston load only, as set out in clause 8.3 of ISO 1133 and clauses 9.8 and 10.10 of ASTM D1238. If, however, the estimated melt flow rate is estimated to be between 20 to 2000 (g/10 min), then the loading setting is determined to require no load or, in other words, using a magnetic piston, if such an arrangement is compatible with the testing configuration. In this particular example, where a piston is required, the piston holding position is 60 mm, which is chosen to provide a suitable starting height and duration of preheating. It should be apparent to the skilled person that the example ranges and values are given as one specific example only, and that other ranges and values may be used. Based on a sample input indicative of an estimated value of the sample melt flow rate, a corresponding loading setting is determined.

Determining Testing Parameters Based on Both Melt Flow Rate Testing Procedure and Estimated Values of the Melt Flow Rate FIG. 12 shows a testing parameter table for sample quantities during melt flow rate testing. Each row of the table corresponds to a range of estimated melt flow rate values. The table further includes two columns, each corresponding to a melt flow rate testing procedure, one column for melt flow rate testing under ISO 1133, and another column for melt flow rate testing under ASTM D1238. The ranges of expected melt flow rate values, in this example, are interpolated and extrapolated from ISO 1133 melt flow rate values for ISO 1133-1, Table 4. The ranges of expected melt flow rate values, in this example, are interpolated and extrapolated from ASTM D1238 melt flow rate values for ASTM D1238, Table 2. Based on both a reference input indicative of a selected melt flow rate testing procedure, and a sample input indicative of an estimated value of the sample melt flow rate, a sample quantity for the melt flow rate test can be determined.

FIG. 13 shows a testing parameter table for a preheating phase end condition time. Each row of the table corresponds to a range of estimated melt flow rate values. For the rows containing a melt flow rate in the range of 0 to 10 (g/10 min), 10 to 20 (g/10 min) and 20 to 50 (g/10 min), a corresponding preheating phase end condition time is provided, interpolated from the values in ISO 1133, clauses 8.4 and 9.5, and in ASTM D1238, clauses 9.8 and 10.10. However, for the row containing a melt flow rate between the range of 50 to 2000 (g/10 min), the resulting preheating phase end collection times depends upon a reference input indicative of a selected melt flow rate testing procedure. This is because the preheating time required under ASTM melt flow rate testing is longer. Depending on the estimated mass flow rate of the sample, a preheating phase end condition can be determined. In the event where the estimated sample mass flow rate is between 50 to 2000 (g/10 min), an additional reference input indicative of a selected melt flow rate testing procedure is used to determine the preheating phase end.

FIG. 14 shows a testing parameter table for the duration of individual measurements, and is applicable for melt flow rate testing procedure types B and C of ISO 1133 and ASTM D1238. Each row of the table contains a range of estimated melt flow rate values corresponding to different duration values of individual measurements. Both the ISO 1133 and ASTM D1238 standards contain no set reference values for this parameter, and therefore the values here are compiled using historic data points and interpolation. Based on both a reference input indicative of a selected melt flow rate testing procedure being a type B or C procedure, and a sample input indicative of an estimated value of the sample melt flow rate, the value of the duration required for individual measurements can be determined.

FIG. 15 shows a testing parameter table for end of testing conditions, being a length parameter and a duration parameter. The table identifies that if the melt flow rate test is under ISO 1133, then the end condition length is 30 mm as set out in ISO 1133, clauses 8.4 and 9.5. If, however, the melt flow rate test is under ASTM D1238, then a further sample input indicative of an estimated value of the melt flow rate is used to determine the end condition length and duration as set out in Table 2 and Table 3 of ASTM D1238. Therefore, based on both a reference input indicative of a selected melt flow rate testing procedure, and a sample input indicative of an estimated value of the sample melt flow rate, the end of testing conditions, being a length parameter and a duration parameter, can be determined.

Other Fixed Parameters

There are other possible melt flow rate testing parameters that may need to be pre-programmed or otherwise input into the testing apparatus which are not dependent on the type of procedure, on any other parameter, or on an estimated value of the melt flow rate. Examples of these fixed parameters are shown in FIG. 16. FIG. 16a is a table which shows that a maximum charging duration is 1 minute regardless of any melt flow rate testing input as set out in ISO 1133-1, clause 8.3 and ASTM D1238, clause 9.6. Similarly, FIG. 16b shows that the minimum time required from the application of an extra force is 2 minutes, as set out in ISO 1133, clauses 8.4 and 9.5, and ASTM D1238, clauses 9.6 and 10.8. FIG. 16c shows that in any melt flow rate test, there is a characterisation setting that final purging and homing do not occur. FIG. 16d shows that in any melt flow rate test, the default melt density is 1.000 g/cm$^3$, and that the priority format of the output is as a melt flow rate. FIG. 16d shows that in any melt flow rate test, there is: no outlier detection; a pass/fail check occurs within a percentage range of outputs; and acceptance values for the melt flow rate are either 3%, or within an expected range given by a user as an estimate of the melt flow rate.

It will be appreciated by persons skilled in the art that the above detailed examples have been described by way of example only and not in any limitative sense, and that various alterations and modifications are possible without departing from the scope of the invention as defined by the appended claims. Various modifications to the detailed examples described above are possible.

Through the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the disclosure are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The disclosure is not restricted to the details of any foregoing embodiments. The disclosure extends to any novel one, or any novel combination, of the features disclosed in this specification (including any accompanying claims, abstract or drawings), or to any novel one, or any novel combination, of the steps of any method or process so disclosed.

It will be appreciated by persons skilled in the art that the above embodiment(s) have been described by way of example only and not in any limitative sense, and that various alterations and modifications are possible without departing from the scope of the invention as defined by the appended claims. Various modifications to the detailed designs as described above are possible.

The invention claimed is:

1. A method of determining testing parameters of a melt flow rate testing apparatus and testing a sample, the method comprising:
   (i) providing a reference input to a melt flow rate testing apparatus indicative of a selection of a melt flow rate testing procedure from a predetermined list of melt flow rate testing procedures;
   (ii) providing a characteristic input to the melt flow rate testing apparatus indicative of a load mass and a testing temperature for melt flow rate testing;
   (iii) providing a sample input to the melt flow rate testing apparatus indicative of an estimated value of the melt flow rate of the sample; and
   (iv) determining, via the melt flow rate testing apparatus without further manual input, at least one characteristic testing parameter for the melt flow rate testing apparatus, utilizing a representative value generated from a combination of said reference input and said sample input,
   wherein the method further comprises at least one of interpolating or extrapolating said representative value from a predetermined standard for said sample input; and
   (v) performing, via the melt flow rate testing apparatus, a melt flow rate test on the sample using the at least one characteristic testing parameter.

2. The method according to claim 1, wherein said reference input is indicative of a selection of said melt flow rate testing procedure from a predetermined list of melt flow rate testing procedures comprising reference standard procedures from ISO standard 1133 and ASTM standard D1238.

3. The method according to claim 1, wherein said predetermined list of melt flow rate testing procedures comprises: procedure A of ISO standard 1133; procedure B of ISO standard 1133; procedure B of ISO standard 1133 with a half die; procedure A of ASTM standard D1238; procedure B of ASTM standard D1238; and procedure C of ASTM standard D1238.

4. The method according to claim 1, wherein said sample input is indicative of an estimated range of values of the melt flow rate of the sample.

5. The method according to claim 1, wherein determining at least one characteristic testing parameter comprises determining a mass of the sample for melt flow rate testing.

6. The method according to claim 1, wherein determining at least one characteristic testing parameter comprises determining at least one geometric parameter of a die of the melt flow rate apparatus.

7. The method according to claim 6, wherein said at least one geometric parameter of said die comprises a capillary diameter.

8. The method according to claim 6, wherein said at least one geometric parameter of said die comprises a capillary length.

9. The method according to claim 1, wherein determining at least one characteristic testing parameter comprises determining at least one of a minimum preheating duration and a maximum preheating duration.

10. The method according to claim 1, wherein determining at least one characteristic testing parameter comprises determining a loading mode for the melt flow rate testing apparatus.

11. The method according to claim 1, further comprising generating a preset setting comprising said determined at least one characteristic testing parameter of the melt flow rate testing apparatus.

12. A method of testing the melt flow rate of a sample using a melt flow rate testing apparatus, comprising the method according to claim 1, and further comprising configuring the testing parameters of the melt flow rate testing apparatus to correspond to said at least one determined characteristic testing parameter.

13. The method according to claim 12, further comprising performing a melt flow rate test on the sample.

14. A melt flow rate testing apparatus, comprising a processor configured to carry out the method of claim 1.

* * * * *